US011918140B2

(12) United States Patent
Rosetta et al.

(10) Patent No.: US 11,918,140 B2
(45) Date of Patent: Mar. 5, 2024

(54) MACHINE TO PREPARE COFFEE BEVERAGES AND CORRESPONDING REGULATION METHOD

(71) Applicant: DE' LONGHI APPLIANCES S.R.L. CON UNICO SOCIO, Treviso (IT)

(72) Inventors: Simone Rosetta, Treviso (IT); Claudia Ciman, Treviso (IT); Antonio Panciera, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 0 days.

(21) Appl. No.: 17/551,040

(22) Filed: Dec. 14, 2021

(65) Prior Publication Data

US 2022/0313007 A1    Oct. 6, 2022

Related U.S. Application Data

(63) Continuation of application No. PCT/IT2021/050093, filed on Apr. 2, 2021.

(51) Int. Cl.
*A47J 31/52* (2006.01)
*A23F 5/26* (2006.01)
*A47J 31/42* (2006.01)

(52) U.S. Cl.
CPC ............... *A47J 31/521* (2018.08); *A23F 5/26* (2013.01); *A47J 31/42* (2013.01); *A47J 31/5251* (2018.08); *A47J 31/5253* (2018.08); *A47J 31/5255* (2018.08)

(58) Field of Classification Search
CPC ...... A47J 31/521; A47J 31/42; A47J 31/5251; A47J 31/5253; A47J 31/5255; A23F 5/26

USPC ........................................................ 426/231
See application file for complete search history.

(56) References Cited

U.S. PATENT DOCUMENTS

| 5,662,955 A | * | 9/1997 | Joseph, Jr. | ............... | A47J 42/44 426/433 |
| 9,980,596 B2 | * | 5/2018 | Rognon | ............. | B65D 85/8058 |
| 2014/0263780 A1 | * | 9/2014 | Day, Jr. | ............... | A47J 31/4492 700/275 |

(Continued)

FOREIGN PATENT DOCUMENTS

| CA | 3065134 A1 | * | 12/2018 | ............... | A47J 31/42 |
| CN | 106998946 A | * | 8/2017 | ............... | A23F 5/08 |

(Continued)

OTHER PUBLICATIONS

International Search Report and Written Opinion of PCT/IT2021/050093 dated Jul. 2, 2021 (11 pages).

*Primary Examiner* — Nathaniel E Wiehe
*Assistant Examiner* — Ket D Dang
(74) *Attorney, Agent, or Firm* — Calfee, Halter & Griswold LLP

(57) ABSTRACT

A machine for preparing coffee beverages comprises an infusion unit comprising an infusion chamber suitable to contain a quantity of coffee powder to be subjected to infusion, a grinding unit to grind coffee beans and obtain coffee powder, a water tank connected to the grinding unit, means for feeding and heating the water, and a dispensing unit fluidically connected to the infusion unit and configured to dispense the beverage prepared into a receptacle. The invention also concerns a method to regulate a machine for preparing coffee beverages.

7 Claims, 3 Drawing Sheets

(56) References Cited

U.S. PATENT DOCUMENTS

2018/0271322 A1    9/2018  Khon et al.
2019/0301924 A1*  10/2019  Muheim ................ A47J 31/42

FOREIGN PATENT DOCUMENTS

WO    WO-2013121438 A1 *  8/2013  .......... A47J 31/3609
WO       2015073732 A1    5/2015

* cited by examiner

MACHINE TO PREPARE COFFEE BEVERAGES AND CORRESPONDING REGULATION METHOD

CROSS-REFERENCE TO RELATED APPLICATIONS

This application is a continuation of Application of PCT/IT2021/050093, filed on Apr. 2, 2021, which claims priority to Italian Application No. 102020000007120, filed on Apr. 3, 2020, the contents of which are hereby incorporated by reference as if recited in their entirety.

FIELD OF THE INVENTION

Embodiments described here concern a machine to prepare coffee beverages, in particular espresso coffee, and a corresponding method to regulate said machine, in which the functioning parameters of the machine can be defined in a substantially automatic way in order to optimize the preparation of the coffee beverage as a function of the type of coffee used.

In particular, the machine and the method according to the invention allow to perform at least a first, rough optimization of the functioning parameters of the machine based on the specific type of coffee bean used, and a second, finer optimization based both on the type of coffee bean and also on the actual functioning of the machine with the parameters defined by the first optimization.

BACKGROUND OF THE INVENTION

It is known that the preparation of a coffee beverage by means of infusion of a coffee powder requires setting and controlling a plurality of different setting parameters, correlated to one or more components of the machine, which can influence the infusion method. In fact, in their turn, the setting parameters set influence and determine the functioning parameters of the machine, on which the quality of the beverage prepared depends.

For this purpose, machines for the production of coffee, of a professional or also domestic type are known, which allow to manually modify one or more setting parameters of the machine, such as, for example, the pressure of the infusion chamber, the temperature and/or the quantity of the infusion water, or possibly also the grain size of the coffee powder and the quantity of coffee used for each beverage, acting on the settings of some components, such as for example the heating means, the means that feed the water, or the device for grinding the coffee powder, the dosing means and others.

In order to correctly regulate and set the parameters of the machine to obtain a "good" coffee beverage, a certain amount of experience and knowledge of the correlation between determinate functioning parameters of the machine and the characteristics of the coffee beverage to be obtained is therefore normally required.

In fact, there are numerous parameters to be taken into account in order to make a good coffee beverage, from the type of coffee being used, the hardness of the water, the humidity of the air or other environmental factors, possibly up to the mechanical and/or physical processes inside the machine to prepare coffee.

The average consumer, however, generally does not have the experience required to manually regulate these parameters and therefore, even if he/she makes several attempts, it is only with difficulty that he/she is able to reach an optimal setting of the machine in objective terms, or may not even reach it at all.

Furthermore, since these functioning parameters can vary according to the type of coffee used, each time a new type of coffee is used it may be necessary for the user to once again regulate the functioning parameters.

There are also automatic or semi-automatic coffee machines which are able to modify the parameters for the preparation of a coffee beverage on the basis of certain inputs provided by the consumer, such as for example the type of beverage desired (cappuccino, espresso, Americano . . . ) or, in some cases, the regulation of the level of grinding of the beans or the infusion temperature, or possibly the strength of the beverage to be obtained. In order to be used at their best, however, these machines also require a high knowledge of the machine itself and of the parameters that condition the preparation of the coffee.

Moreover, these known machines typically use standardized functioning parameters for any type whatsoever of coffee used. This results in a poor versatility of the machine to produce coffee and coffee beverages of very variable quality, as a function of the characteristics of the type of coffee used.

Furthermore, since small roasting companies are increasingly widespread, which produce respective varieties of coffee bean products, differing in terms of origin and level of roasting of the beans, it can be difficult and complicated to identify the combination of adequate operative parameters to obtain a good coffee beverage.

This can lead to frustration for the consumer, who is asked to complete burdensome operations to set the machine correctly, and also to a negative judgment on the functioning of the machine itself, in the event the coffee obtained with determinate standardized parameters does not satisfy the tastes of the consumer.

Document US2018/0271322A1 (US'322) describes a kitchen apparatus, which allows a user to record, and subsequently replicate, a sequence of operations to be performed by the apparatus to obtain a determinate final result. For each operation to be performed, one or more operating parameters to be used in subsequent preparations are memorized. The sequence of operations, or the operating parameters associated with them, can also be modified in real time by a user in order to obtain different operating profiles, each intended to obtain a specific final result.

Document WO 2015/073732 A1 concerns an apparatus and a method for the preparation of beverages, which provides to receive a recipe to be followed, that is, a set of operating parameters to be used to obtain a determinate coffee beverage as required by the producer of the type of coffee used on each occasion. This known solution, although it allows to set the operating parameters of the machine based on a given type of coffee, does not allow to modify or correct the operating parameters in relation to the actual functioning of the apparatus.

There is therefore a need to perfect a machine to prepare coffee beverages and a corresponding method to prepare beverages that can overcome at least one of the disadvantages of the state of the art.

In particular, one purpose of the present invention is to provide a machine to prepare coffee beverages that also allows an inexperienced user to obtain a good coffee beverage in objective terms without requiring burdensome attempts to modify the settings of one or more parameters, using successive approximations.

Another purpose of the present invention is to provide a machine to prepare coffee beverages that allows to easily regulate and optimize the functioning parameters in order to always obtain a coffee beverage that has determinate properties that identify a coffee beverage of high quality.

A further purpose is to perfect a method to regulate a machine to prepare beverages that allows to define and/or set the setting parameters and thus regulate the functioning of the machine automatically, or at least requiring the minimum intervention possible from the consumer, so as to obtain beverages of high quality for any type whatsoever of coffee beans used.

Another purpose of the present invention is to provide a machine and a method that allow the consumer to recognize whether an optimal setting of the machine has or has not been reached, irrespective of his/her personal tastes concerning the beverage obtained.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, embodiments described here concern a machine for preparing coffee beverages, comprising:

- an infusion unit comprising an infusion chamber suitable to contain a quantity of coffee powder to be subjected to infusion;
- a grinding unit configured to grind the coffee beans and obtain a coffee powder with the desired granulometry;
- a water tank connected to the infusion unit;
- water feed means configured to feed water from the tank to the infusion unit;
- heating means to heat the water fed to the infusion unit;
    - a dispensing unit fluidically connected to the infusion unit and configured to dispense the beverage prepared into a receptacle.

The machine also comprises an interface by means of which information on the characteristics of a type of coffee beans to be used can be acquired.

According to some embodiments, the characteristics comprise at least the variety of the beans, for example Arabica, Robusta, Arabica-Robusta blend in determinate percentages, and the roasting level.

According to some embodiments, the interface can comprise an electronic device on which a dedicated software application can be installed, by means of which specific questions can be posed to the user concerning the characteristics of the coffee, for example of the multiple-choice type, and the answers can be acquired.

According to possible variants, it can be provided that the interface is configured to acquire the information on the type of coffee beans by means of reading/scanning an identifier, or a code of the bar or QR type, applied to a package of coffee beans.

According to some embodiments, the interface can be configured to also receive a request to perform a procedure of optimizing the setting of the machine, or also feedback from a consumer regarding one or more objective characteristics of a prepared beverage.

The machine also comprises a memory unit, or a database, in which a plurality of sets of operative parameters are stored and/or made available, each associated with a type of coffee beans, and suitable to obtain a coffee beverage with properties defined for each type of coffee beans.

According to some embodiments, each set of operative parameters comprises at least one setting parameter that can be set by a user, or automatically by a control unit of the machine.

According to other embodiments, each set of operative parameters comprises a combination of at least two setting parameters.

According to further embodiments, each set of operative parameters comprises a combination of at least three setting parameters.

According to embodiments, the at least one setting parameter is selected from: granulometry/grinding level of the coffee beans, quantity of coffee powder for a beverage, characteristics correlated to the pre-infusion, for example duration, quantity, temperature of the pre-infusion water, temperature of the infusion water, infusion time, quantity of infusion water, infusion pressure.

The set of operative parameters can comprise expected values of one or more extraction parameters, which are correlated to the setting parameter(s) and are directly dependent on them, which, if respected, allow to obtain a quality beverage.

The at least one extraction parameter can be selected from flow time, infusion time or dispensing time of the beverage, pressure in the infusion chamber, infusion temperature, speed/flow rate of the infusion water, quantity of water, or beverage, dispensed, or others.

The machine also comprises a control unit configured to receive from the interface at least the information on the characteristics of the type of coffee beans, and process this information on the basis of data present in the memory unit, so as to automatically obtain at least a first set of operative parameters optimized for regulating the components of the machine.

The at least one first set of optimized operative parameters allows to perform a first approximate optimization of the machine, that is, of its functioning, which is strictly correlated to the type of coffee beans.

The control unit can be configured to select, from the plurality of sets of operative parameters available and/or process on the basis of data present on the memory unit, the one associated with this type of coffee beans, and command the functioning of the components of the machine on the basis of the set of operative parameters selected.

According to other embodiments, the control and command unit is also configured to carry out another finer optimization of the machine at least as a function of at least one actual extraction parameter of the machine, measured during the preparation of a beverage with the settings defined by the at least one setting parameter associated with the set of operative parameters used, and at least one expected extraction parameter associated with this set of operative parameters.

The control unit can receive at least an actual value of at least one extraction parameter, measured during the dispensing of a beverage by means of detection devices, and process the information received on the basis of data present on the memory unit and of the set of operative parameters considered, in order to evaluate if, and how, to modify one or more of the setting parameters to carry out the second finer optimization.

The control and command unit is also configured to receive, by means of the interface, feedback from a consumer regarding a coffee beverage prepared with the set of operative parameters selected, and to determine whether or not it is necessary to modify one or more setting parameters of the set of operative parameters selected, and possibly which one, on the basis of the feedback received, in order to carry out the second fine optimization of the machine.

According to some embodiments, the control unit and/or the memory unit can be physically integrated in the machine, or they can be obtained on a cloud-type platform accessible by means of an Internet provider and communicating with a command unit provided on the machine.

The interface can also be provided on the machine, or on an autonomous electronic device, communicating with the memory unit and with the control unit of the machine.

According to some embodiments, the control unit is configured to command, possibly by means of the command unit, the components of the machine, including grinding units, infusion units, means to heat and feed water, in a substantially automatic manner, in order to set them with the desired setting parameters, limiting as much as possible the consumer's intervention in the management of the machine itself.

In other words, the control unit allows to set, in a substantially automatic manner, the functioning of the machine on the basis of a set of parameters optimized for the type of coffee beans used, by acting directly on the components of the machine, or supplying specific indications to a user on which components to act on manually and on what level, or operative position, to set them.

Once the set of optimized operative parameters has been defined, it can be used to prepare other types of coffee beverage provided by the machine, including, for example, ristretto coffee, Americano coffee, or, in the event the machine also comprises a milk dispensing unit, also macchiato coffee, cappuccino, or similar, as a function of the selection made by the consumer.

Advantageously, therefore, the machine allows to obtain a good quality coffee beverage for any type whatsoever of coffee beans used, and substantially from the first use of the machine and/or a new type of coffee beans.

Providing a plurality of sets of operative parameters for a specific variety of coffee and a specific roasting level allows to obtain on each occasion a coffee beverage that meets determinate structural requirements of the body/frothiness that a "good quality" coffee beverage has to possess.

In this way, the consumer can always savor a coffee beverage that highlights the aromas and characteristics of the type of beans used.

In particular, the machine allows to obtain a "good quality" coffee beverage having determinate expected and specific characteristics for the type of coffee beans considered.

For example, in the case of an espresso coffee, a "good quality" beverage has a froth with an ideal height of about 4-5 mm, with a determinate color, which is different in the case of "Arabica", or "Robusta" types of coffee beans, and a determinate structure of the body.

According to some embodiments, the feedback received from a user by means of the interface can concern one or more characteristics of the beverage prepared.

According to possible implementations, a software application can be installed on the interface configured to pose specific questions to the consumer, for example of the multiple-choice type, concerning: quantity and/or color of the froth, structure of the body, intensity of the flavor, and acquire the answers of the consumer and the control unit can determine if and which setting parameter to modify on the basis of the answers obtained.

According to further embodiments, the machine can comprise at least one sensor configured to measure, during the preparation of a beverage, one or more actual extraction parameters selected from infusion and/or pre-infusion time, infusion pressure, speed/flow rate of the water being fed, quantity of infusion and/or pre-infusion water.

The control and command unit, on the basis of the data received from the user and of the data detected by the sensors, can determine whether the characteristics of the beverage prepared correspond, or not, to the characteristics of the beverage that are expected for the set of operative parameters selected, and associated with the type of coffee beans, or whether it is necessary, or appropriate, to modify one or more operative parameters of the set considered, in order to further optimize the regulating of the machine and improve the coffee beverage.

In particular, if the at least one actual extraction parameter, measured during use, corresponds to the at least one expected extraction parameter, and the characteristics of the coffee beverage prepared correspond to the expected characteristics, the control unit can determine that the machine is functioning correctly, and it is not necessary to modify the setting parameters, while if the at least one extraction parameter, or one or more characteristics do not correspond, there may be a setting parameter that is not optimized, which can therefore be modified.

Embodiments described here also concern a method to regulate a machine for preparing a coffee beverage which provides to:

make available a plurality of sets of predefined operative parameters, each associated with a type of coffee beans having a determinate profile of characteristics, and suitable to obtain a coffee beverage with determinate qualities, wherein each set of operative parameters comprises at least one setting parameter of the machine, and at least one expected extraction parameter, correlated to at least one setting parameter;

acquire an indication on the type of coffee beans to be used;

carry out a first approximate optimization of the machine, correlated to the type of coffee beans, by selecting, from the plurality of sets of operative parameters made available, the one associated with this type of coffee beans; and command the functioning of the machine on the basis of the set of operative parameters selected by setting the machine on the basis of the at least one setting parameters associated with the set of operative parameters selected;

verify if the first optimization carried out is suitable, or carry out a second finer optimization of the machine on the basis of a comparison between at least one actual extraction parameter of the machine, measured during the preparation of a beverage with the at least one setting parameter set, and the at least one expected extraction parameter, associated with the set of operative parameters used.

According to some embodiments, in order to carry out the second optimization of the machine, the method provides to:

receive, by means of the interface, feedback on one or more characteristics of the beverage prepared with the set of operative parameters selected;

determine whether or not it is necessary to modify one or more setting parameters of the set of operative parameter selected, and possibly which one, on the basis of the set of operative parameter selected and the feedback received.

According to some embodiments, the step of acquiring information on the type of coffee beans comprises posing, by means of the interface, a series of multiple-choice questions to the consumer concerning the characteristics relating at least to the variety and roasting level of the coffee beans and receiving the corresponding answers.

According to possible variants, the step of acquiring information on the type of coffee beans comprises reading/scanning by means of the interface an identifier or a code applied on a package of coffee beans.

According to other variants, the step of acquiring information on the type of coffee beans comprises selecting a determinate brand of coffee from a list made available to the consumer on the interface, wherein each brand is associated with a determinate type and/or level of roasting of the coffee beans.

With the term "brand" of coffee here and hereafter in the description we refer to the overall information that identifies the final product marketed and which can comprise both the commercial name of the product or the producer, for example the brand or name, and also the reference to a specific type, or variety, of the product itself or product line, each having its own characteristics of type of coffee beans and level of roasting.

According to some embodiments, a software application is installed or made available on the interface, by means of which the consumer can access a digital platform, for example a virtual marketplace, and purchase a package selected from the brands of coffee beans supplied by one or more producers; in this case, it can be provided that the list of available brands is automatically generated and updated on the basis of the purchases made.

According to other embodiments, in addition or as an alternative to accessing the digital platform, by means of the interface the consumer can access a database in which a plurality of brands of coffee beans supplied by one or more producers is stored; in this case, the list can comprise all the brands available in the database.

According to some embodiments, the method can comprise the further step of verifying whether the type of coffee beans is new, or whether it has already been used previously and therefore a respective stored profile exists.

According to some embodiments, in the event the type of coffee beans is new, the method provides to create and store a new profile of coffee beans, associating it with the set of operative parameters selected for the characteristics of the type of coffee.

According to some embodiments, in the event the type of coffee beans is not new, and a profile associated with it already exists, the method can provide to carry out a process of optimization of the operative parameters associated with the profile also on the basis of feedback received from a consumer, so as to obtain a second finer and more precise optimization of the settings of the machine.

According to some embodiments, the optimization process provides to:
prepare a test coffee beverage with the setting parameters of the set of operative parameters associated with the profile;
measure one or more actual extraction parameters of the machine during the preparation of the test beverage;
acquire feedback from the consumer on one or more characteristics relating to the appearance of the test beverage prepared;
process the data relating to the actual extraction parameter(s) measured and to the characteristics of the beverage, comparing them with respective one or more expected extraction parameters and expected characteristics of the beverage, to determine whether or not it is necessary to modify one or more setting parameters of the set of operative parameters used.

The measurement of the extraction parameters and the acquisition of feedback from the user allows to obtain comparisons and information on different aspects correlated to the actual functioning of the machine, so as to be able to more effectively evaluate the correctness of the set of setting parameters used and eventually identify which parameters possibly need correcting.

According to some variants, in the event that it is deemed necessary to modify one or more setting parameters of the set considered, it can be provided that the control and command unit acts directly on the components of the machine in order to set them according to the new setting parameters defined, or that it provides an indication to the user by means of the interface on which components to modify and how. In the event that, on the contrary, it is not deemed necessary to make modifications to the set of parameters, it can be provided to supply an indication to the consumer regarding possible alternative solutions for optimizing the beverage.

Such possible alternative solutions can comprise a suggestion to try different types of coffee beans, or possibly to carry out maintenance interventions on one or more components of the machine.

According to some embodiments, the method can also provide to measure one or more actual extraction parameters even during normal functioning and to keep track and memorize at least a defined number of such actual extraction parameters measured, obtaining a history of their trend, and to evaluate whether and how to modify the one or more setting parameters of the set of operative parameters used in relation to the comparison with the extraction parameters stored.

According to some embodiments, the method can also provide to store the new set of operative parameters in the profile of the coffee beans considered.

In this way, when a coffee beverage with that determinate profile of coffee beans is requested, the new set of operative parameters will be used, which is therefore optimized not only on the basis of the type of coffee, but also on the basis of the actual extraction parameters(s) and the general appearance of the beverage indicated by the user.

In the event the consumer continues to be not satisfied with the result, or in general in the event the beverage obtained does not have the expected characteristics in terms of body, foam and more, typical of a coffee of good quality, another optimization process can be performed.

According to other embodiments, the method provides to make visible to the consumer by means of the interface at least some setting parameters of the new set of operative parameters and to store the new set of operative parameters in the corresponding profile after having received a confirmation from the consumer.

BRIEF DESCRIPTION OF THE DRAWINGS

These and other aspects, characteristics and advantages of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. Moreover, it is clarified that the phraseology and the terminology used herein has descriptive purpose and shall not be intended has limitative.

Figure 1:
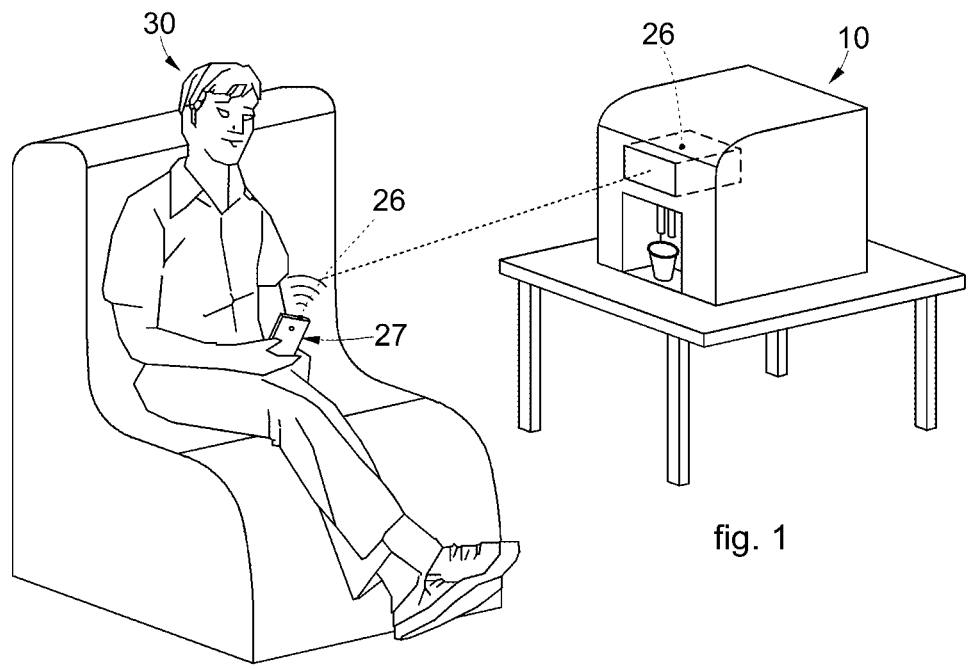
FIG. 1 is a schematic illustration of machine for preparing coffee beverages in accordance with the present invention.
Figure 2:
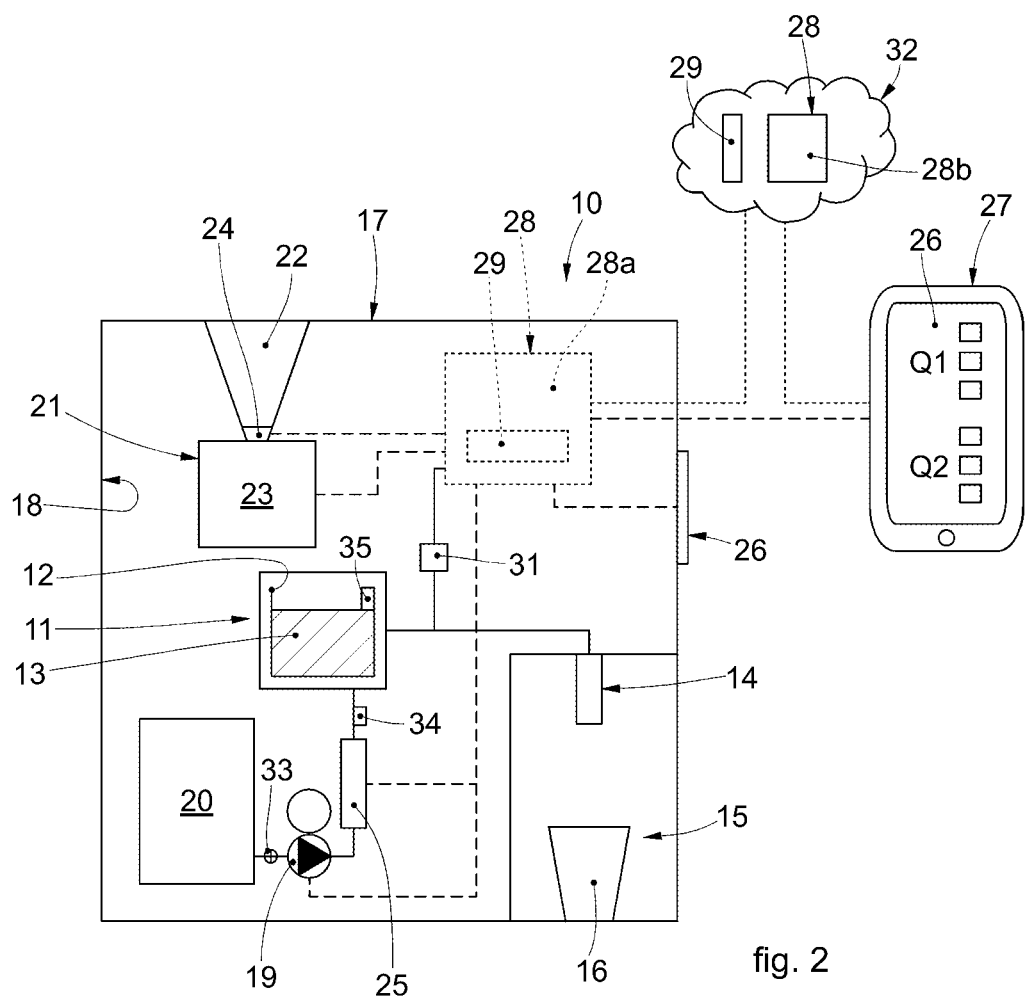
FIG. 2 is a schematic view of one embodiment of the machine of FIG. 1.
Figure 3:
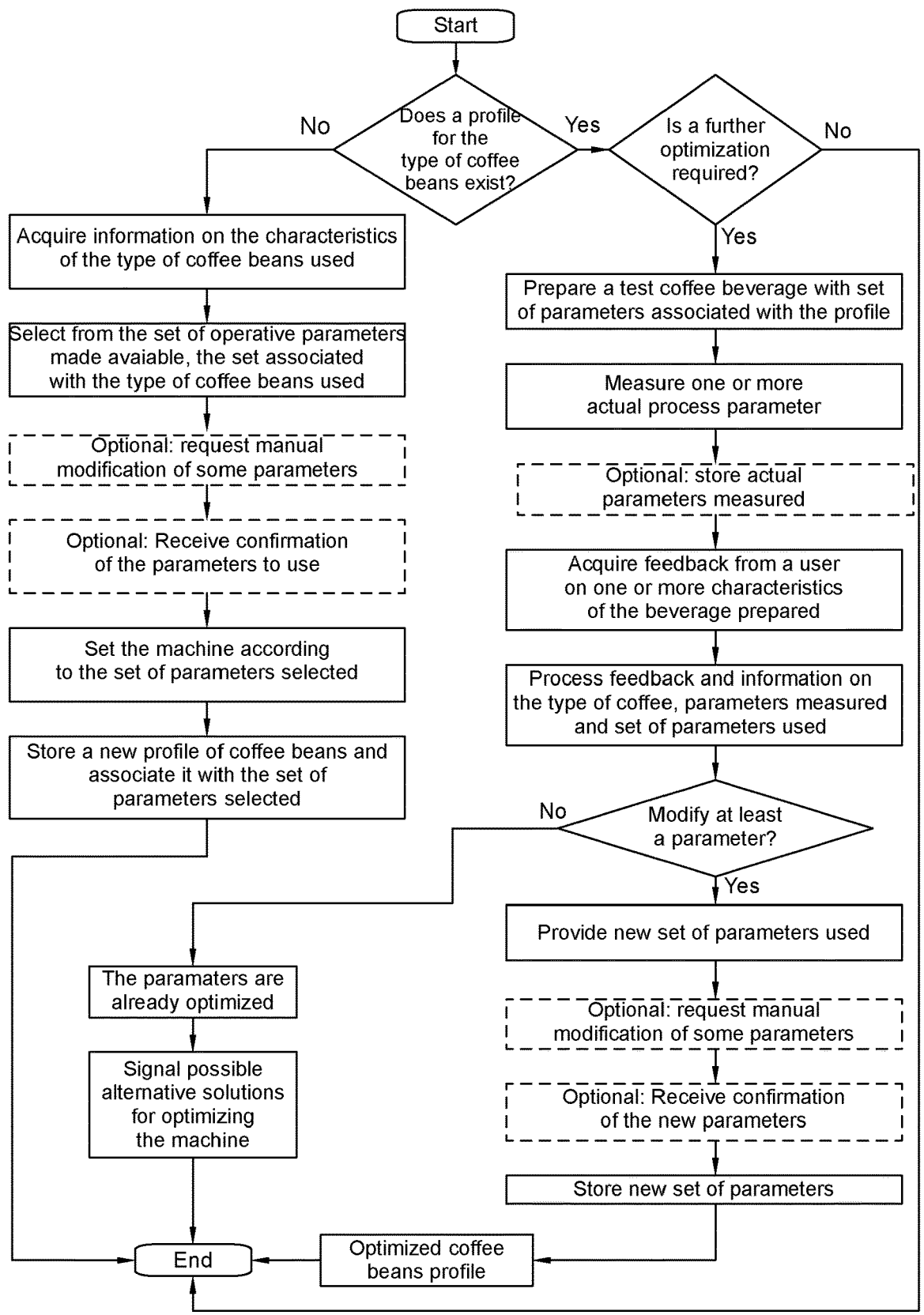
FIG. 3 is a block diagram of a method to regulate a machine for preparing coffee beverages according to possible embodiments.

With reference to FIGS. 1-2, a machine 10 for preparing coffee beverages comprises an infusion unit 11 configured to produce a coffee beverage and comprising an infusion chamber 12 suitable to contain a quantity of coffee powder 13 to be subjected to infusion.

The machine also comprises a dispensing unit 14 fluidically connected to the infusion unit 11 and configured to dispense the coffee beverage toward a dispensing zone 15 in which a receptacle 16 suitable to receive the beverage prepared, generally a cup, a mug, or a small cup, can be positioned.

By coffee beverage we mean, in particular, a coffee-based beverage such as espresso coffee, and in particular an espresso coffee beverage having characteristics of structure of the body, frothiness, intensity that meet the standards normally required for a high quality beverage.

The machine 10 can comprise a frame 17 on which the dispensing unit 14 is installed and which defines a compartment 18 suitable to house the infusion unit 11 and the other components of the machine 10.

The machine 10 also comprises a water tank 20 or other water supply element connected to the infusion unit 11 and water feed means 19, for example a pump, configured to feed water from the tank 20 to the infusion unit 11.

According to one embodiment, the machine 10 also comprises a grinding unit 21 associated with means 22 for introducing coffee beans and configured to grind the coffee beans.

According to some embodiments, the grinding unit 21 can comprise a grinding device 23 configured to grind the coffee beans with granulometry differentiated as a function of needs. In particular, a plurality of different grinding levels can be provided, for example in a number comprised between 2 and 15.

The grinding unit 21 can also be provided with a dosing device 24 configured to dose the quantity of coffee powder to be used for the preparation of a beverage.

The dosing device 24 can be located upstream or downstream of the grinding device 23, and therefore be configured to weigh the coffee beans before the grinding or, respectively, the already ground coffee powder.

The machine 10 also comprises heating means 25 configured to heat the water to be fed to the infusion unit 11.

According to some embodiments, the heating means 25 can be disposed along the path of the water between the tank 20 and the infusion unit 11.

According to variant embodiments, not shown, the heating means 25 can be associated with the tank 20, which can therefore itself act as a boiler.

According to some embodiments, the heating means 25 can be suitably commanded and adjusted on each occasion to heat the water for the infusion of the coffee powder to a determinate temperature. For example, the heating means 25 can be selectively activated/deactivated using a variable-length pulse signal (PWM—Pulse Width Modulation) in order to modify the average temperature value as a function of needs.

According to some embodiments, the machine 10 comprises an interface 26 by means of which information can be acquired on the characteristics of the type of coffee beans which are used for the preparation of the beverage, that is, the coffee beans that are introduced and/or are present in the grinding unit 21.

According to some embodiments, the interface 26 can also comprise a touch-sensitive screen, or commands by means of which a consumer 30 can command the start of the preparation of a beverage.

According to some embodiments, the interface 26 can be positioned on the frame 17 of the machine 10.

According to possible embodiments, the interface 26 can be provided on an electronic device 27, for example a smartphone, a tablet or other similar device, on which a dedicated software application can be installed.

According to some embodiments, at least one software application is installed on the interface 26 by means of which the consumer 30 can at least provide information concerning the type of coffee beans that are used for the preparation of the coffee beverage and/or feedback concerning determinate properties and qualities of a coffee beverage prepared.

According to some embodiments, by means of the software application specific questions Q1, Q2 can be posed to the consumer 30, for example of the multiple-choice type, and the corresponding answers can be acquired.

According to some embodiments, the information concerning the type of coffee beans comprises one or more of either the variety of beans, the level of roasting, the roasting date, the packaging date, the brand, or the name of a producer, or other.

According to preferred embodiments, the information on the type of coffee comprises at least the variety of the coffee beans and the level of roasting thereof.

By variety of coffee beans we mean the origin of the beans, for example "Arabica", "Robusta", "Arabica-Robusta blend", "Single-Origin", or other.

The roasting level can comprise a plurality of levels, for example definable on the basis of the color of the coffee beans visible to the consumer, such as "light", "medium", "dark", "extra-dark", or on the basis of information which can be provided directly by a producer.

According to a possible embodiment, the machine 10 can comprise a verification kit showing a color scale, which can be used by a consumer 30 to evaluate the roasting level of the beans he/she intends to use comparing the color of the beans with the scale.

According to some embodiments, the consumer 30 can manually enter the information relating to the type of coffee to be used, for example answering a series of multiple choice questions. For example, the interface 26 can be configured to suggest a list of multiple options concerning the variety of beans and the level of roasting that the consumer can choose from.

Moreover, the interface 26 can be configured to suggest to the consumer 30 where to look for the information on the variety and/or roasting level of the beans, for example on the package thereof.

The interface 26 can also invite the consumer 30 to use the verification kit provided.

According to further embodiments, the electronic device 27 can be configured to read an identifier or a code displayed, for example, on a package of coffee beans, and containing information on the coffee beans enclosed in the package and/or on their brand.

According to possible variants, not shown, it can also be provided that an optical reader suitable to read/scan an identifier or a code is installed on the machine 10.

According to other embodiments, a software application can be installed on the interface 26 by means of which a list of brands of coffee beans supplied by one or more producers 37 can be made available to the consumer 30, from which the consumer 30 can select the one to use.

According to these embodiments, since each brand of coffee beans can be intrinsically correlated to a certain type of coffee beans T and/or to a certain level of roasting R, the selection of the brand can directly provide this information.

Figure 4:
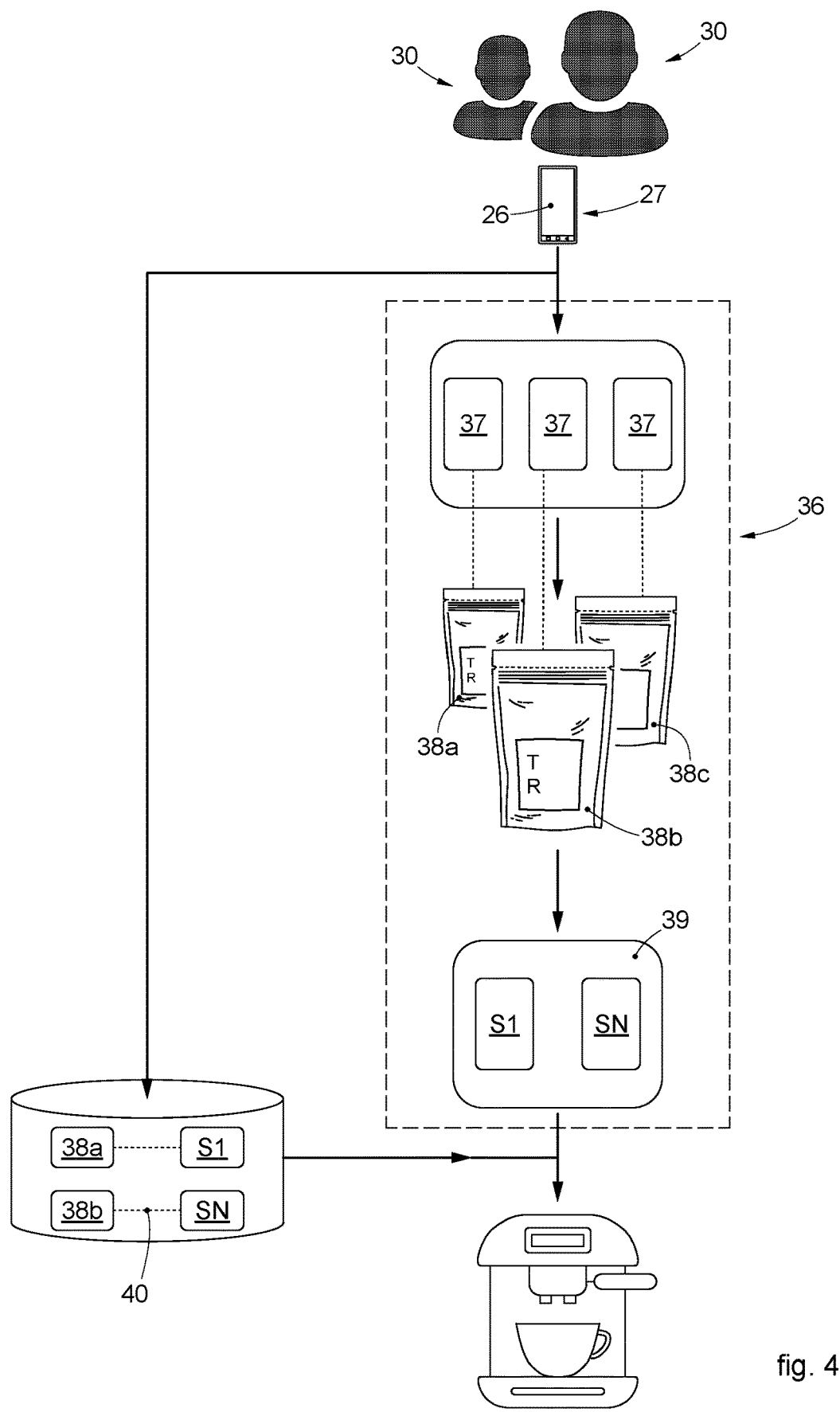
FIG. 4 is a flow diagram of the method to regulate a machine for preparing coffee beverages according to one variant.

According to possible embodiments, by means of the software application the consumer 30 can access a digital platform 36, for example a virtual marketplace, on which a plurality of brands of coffee beans 38a, 38b, 38c supplied by one or more producers 37 are made available for purchase (FIG. 4).

According to this embodiment, it can be provided that the list of available brands is automatically generated and updated on the basis of the purchases made and displayed on the interface 26.

In the digital platform 36, or connected to it, a memory unit 39 or a database can be provided, in which a specific set of operative parameters S1 . . . SN is stored for each of the brands that can be purchased.

According to other embodiments, in addition or as an alternative to accessing the digital platform 36, by means of the interface 26 the consumer can access a database 40 in which a plurality of brands of coffee beans supplied by one or more producers 37 is stored, each associated with its own set of operative parameters S1 SN.

In this case, the list can comprise all the brands available in the database 40. The database 40 can be of the fixed or dynamic type, and comprise a variable number of items. For example, it can be provided that the database 40 is updated periodically, or every time an item has to be inserted or deleted, by a manager of the database 40, or possibly by producers and/or sellers authorized to modify their items.

According to some embodiments, the interface 26 can be configured to receive feedback from the consumer 30 on one or more characteristics of a beverage prepared.

According to possible implementations, the interface 26, by means of the software application, can pose specific questions to the consumer 30, for example of the multiple-choice type, concerning: quantity and/or color of the froth, structure of the body, intensity of the taste, and acquire the consumer's answers.

According to some embodiments, the machine 10 also comprises a control unit 28 configured to command the functioning of the machine 10, and in particular of the different components thereof, on the basis of setting parameters correlated to the type of coffee beans used, which in turn determine specific expected values of one or more extraction parameters. For example, the quantity of coffee or its granulometry can affect the transit speed of the water through the dose of coffee and therefore also the pressure in the infusion chamber and the flow time.

According to some embodiments, the machine also comprises a memory unit 29 in which a plurality of sets of operative parameters S1, S2, SN can be stored, each associated with a type of coffee beans, suitable to obtain a coffee beverage with defined properties optimal for the type of coffee beans used.

Possible sets of operative parameters S1 . . . SN can also be stored in the memory unit 29, which are received by means of the digital platform 36 and/or the data base 40.

According to some embodiments, the sets of operative parameters S1-SN comprise at least one setting parameter, with which at least one component of the machine 10 can be set, and at least one expected extraction parameter, correlated to the at least one setting parameter.

The at least one setting parameter can be selected from: granulometry/grinding level of the coffee beans, quantity of coffee powder for a beverage, temperature of the infusion water, infusion time, flow rate of the infusion water, quantity of infusion water, infusion pressure, quantity of coffee beverage to prepare, pre-infusion characteristics such as temperature and/or quantity of pre-infusion water, pre-infusion time, or other.

The at least one extraction parameter can be selected from flow time, infusion or dispensing time of the beverage, pressure in the infusion chamber, speed/flow rate of the infusion water, quantity of water, or beverage dispensed, or other.

According to preferred embodiments, the sets of operative parameters S1-SN comprise a combination of at least two setting parameters.

According to other preferred embodiments, the sets of operative parameters S1-SN comprise a combination of at least three setting parameters.

The expected extraction parameter or parameters will therefore be correlated to each, or to the combination, of the two or more setting parameters.

According to some embodiments, the at least three setting parameters comprise the granulometry of the coffee powder, the quantity of coffee and the temperature of the infusion water.

According to preferred embodiments, the at least one expected extraction parameter that is considered is selected from the water flow rate or the flow time.

According to some embodiments, a set of operative parameters S1-SN can be stored for each combination of variety/level of roasting of coffee beans, for example "100% Arabica/Light", "100% Arabica/Medium", "Robusta/Light", "Robusta/Dark", "Arabica 50%—Robusta 50% Blend/Medium", etc.

According to possible variants, tables and correlations between the values of the setting parameters to be considered and the characteristics of the coffee beans can be pre-stored in the memory unit 29, from which it is possible to obtain the sets of operative parameters for each combination of variety/level of roasting with the corresponding expected extraction parameters.

According to some embodiments, the sets of operative parameters can be defined on the basis of experimental data or data obtained from tables, or can be supplied by a producer/supplier of coffee beans, or they can be extrapolated from market surveys on the level of consumer satisfaction, in order to reach a combination of optimal process parameters for a determinate type of coffee beans.

According to some embodiments, a plurality of profiles P1, P2, PN can also be stored in the memory unit 29, created by a consumer or supplied by means of a software application, one for each combination of variety/roasting of the coffee beans, for example single-origin/light, 100% Arabica/medium, etc, each associated with a determinate set of operative parameters S1-SN.

According to some embodiments, one or more setting parameters of the set of operative parameters S1-SN associated with a determinate profile P1-PN can be updated, or modified, on the basis of feedback provided by the consumer 30. Moreover, new profiles P can be entered and stored, associated with respective sets of operative parameters Si.

In the event that a digital platform 36 and/or a database 40 is provided, the profiles associated with specific brands of coffee beans acquired and/or selected by a consumer 30 can also be stored in the memory unit 29.

According to some embodiments, the memory unit 29 can be disposed inside the frame 17 and be physically connected to the control unit 28, or it can be physically separated therefrom, but connected by means of a wireless communication network.

According to other embodiments, at least one of either the memory unit 29 or the control unit 28 can be obtained on a cloud-type platform 32 and can communicate with each other by means of a wireless communication network through an Internet provider.

According to other embodiments, the control unit 28 can comprise a command unit 28a provided in the machine 10 and a processing unit 28b provided in the cloud platform 32, which can directly communicate with each other, or by means of the software application installed on the electronic device 27.

According to some embodiments, the control and command unit 28 is configured to receive from the interface 26 the information on the characteristics of the type of coffee beans, to select, from the plurality of sets of operative parameters S1-SN stored, the one associated with this type of coffee beans, and command the functioning of the components of the machine 10 on the basis of the setting parameters provided by the set of operative parameters selected.

According to some variants, the control and command unit 28 is configured to receive by means of the interface 26 the set of operative parameters S1 . . . SN associated with the brand of coffee beans purchased by the consumer 30 on the digital platform 36 and/or selected from those available on the database 40.

The control and command unit 28 can be configured to directly command one or more of either the grinding unit 21, the heating means 25, the water feed means 19 or the infusion unit 11 on the basis of the setting parameters of the set selected, or it can provide an indication to the user, for example by means of the interface 26, on how to set these components, in order to obtain a coffee beverage having determinate properties and qualities.

In the case of an espresso type coffee beverage, the properties and qualities of an "optimal" beverage can comprise, for example, a medium structure of the body, and a determinate quantity of froth having a determinate color. The "optimal" characteristics of an espresso coffee beverage can differ as a function of the type of coffee beans used. For example, the color of the froth obtained with the "Arabica" variety of coffee beans is generally hazel brown, with brown/reddish streaks, while the froth obtained with the "Robusta" variety beans has a dark hazel/light brown color without streaks.

Furthermore, the froth obtained with "Robusta" coffee beans is normally more compact than the froth obtained with "Arabica" coffee beans.

In particular, the control unit 28 can control and command:
- the heating means 25 to adjust the infusion temperature;
- the grinding unit 21 to adjust the level of grinding and/or the quantity of ground coffee powder;
- the infusion unit 11, possibly in cooperation with the water feed means 19, in order to adjust one or more of either the quantity, flow rate, speed or pressure of the water for the infusion or the pre-infusion.

According to further embodiments, the machine 10 can comprise at least one sensor 31 configured to measure, during the preparation of a beverage, one or more actual extraction parameters selected from flow time, infusion or dispensing time of the beverage, speed/flow rate of the infusion water, quantity of water or beverage dispensed, pressure in the infusion chamber.

According to some embodiments, a plurality of sensors can be provided, each configured to measure a determinate extraction parameter. For example, the machine 10 can comprise one or more of either a flow meter 33 disposed along the water circuit downstream of the infusion chamber, a temperature sensor 34 associated with the heating means 25 or with the circuit downstream thereof, a pressure sensor 35 associated with the infusion chamber 12, and possibly another flow meter 35 downstream of the infusion chamber 12, or a sensor suitable to measure the delivery time or other.

According to some embodiments, the machine 10 comprises at least one sensor 31 configured to measure the infusion time, also known as flow time.

The control unit 28, on the basis of the data detected by the at least one sensor 31, and of the data received from the user, can determine whether the beverage prepared corresponds, or not, to the "optimal" beverage expected for the set of parameters selected, and associated with the type of coffee beans used, and possibly modify one or more setting parameters of the set considered, in order to optimize a subsequent coffee beverage.

Embodiments described here concern a method to regulate a machine 10 for preparing coffee beverages, which allows to select and/or set the functioning parameters of the machine 10 in order to obtain the best possible coffee beverage for a determinate type of coffee beans.

The method according to the invention, although providing to receive feedback from the user, is not intended to adjust the setting and functioning parameters to optimize the taste and properties of the beverage on the basis of the tastes of the consumer, but rather to adjust the setting parameters of the machine 10 in order to obtain determinate extraction parameters that allow to obtain the best possible coffee beverage with the coffee beans available.

The method according to the invention provides to:
- make available a plurality of sets of predefined operative parameters S1 . . . SN, each associated with a type of coffee beans having a determinate profile of characteristics, and suitable to obtain a coffee beverage with defined properties, comprising at least a setting parameter and an expected value of an extraction parameter correlated to this setting parameter;
- acquire an indication on the type of coffee beans to be used;

select, from the plurality of sets of operative parameters S1 . . . SN made available, the one associated with this type of coffee beans; and define and/or set the functioning parameters of the machine 10 on the basis of the at least one setting parameter of the set of operative parameters selected.

Each set of operative parameters S1 . . . SN comprises at least one setting parameter selected from: granulometry/grinding level of the coffee beans, quantity of coffee powder for a beverage, temperature of the infusion water, infusion time, quantity of infusion water, infusion pressure, pre-infusion characteristics such as temperature and/or quantity of the pre-infusion water, pre-infusion time.

According to preferred embodiments, each set of operative parameters S1 . . . SN comprises a combination of at least two setting parameters.

According to other preferred embodiments, each set of operative parameters S1 . . . SN comprises a combination of at least three setting parameters.

According to preferred embodiments, the setting parameters comprise at least one of either the quantity of coffee powder, the granulometry/grinding level or the water temperature, preferably at least two of them and even more preferably all three.

According to some embodiments, the step of acquiring information on the type of coffee beans comprises posing a series of multiple-choice questions Q1, Q2 to the consumer 30 by means of the interface 26 concerning the characteristics relating to at least the variety and roasting level of the coffee beans, and receiving the corresponding answers.

According to possible variants, the step of acquiring information on the type of coffee beans comprises reading/scanning an identifier or a code applied on a package of coffee beans.

According to a first solution, it can be provided that information is stored in the identifier or code, regarding the characteristics of variety and roasting level of the beans and that they can therefore be directly obtained by scanning the identifier or code.

According to another solution, which can be combined with the previous one, it can be provided that by scanning the bar code the brand of the coffee beans can be determined and that this brand is in turn associated with its own set of operative parameters S1 . . . SN. The association between the brand and the set of operative parameters S1 . . . SN, for example, can be pre-stored in the memory unit 29, or it can be carried out by the control unit 28 on the basis of information stored in the memory units 29 or supplied by means of the digital platform 36.

According to possible variants, the step of acquiring information on the type of coffee beans comprises the selection of a determinate brand of coffee from a list made available to the consumer 30 on the interface 26, in which each brand is associated with a determinate type and/or roasting level of the coffee beans and a respective set of operative parameters S1 . . . SN.

According to some embodiments, the software application is associated with a digital platform 36, in particular a virtual marketplace and the list of the available brands is automatically generated and updated on the basis of the purchases made by the consumer by means of the digital platform 36.

According to other embodiments, the list of available brands is stored in a database 40 which the consumer 30 can access by means of the interface 26.

According to some embodiments, the regulation method can comprise verifying whether the type of coffee beans is new, or whether it has already been used previously and therefore a respective stored profile P1 . . . PN exists.

A profile P1 . . . PN can comprise at least information on: variety of the coffee beans, roasting of the coffee beans, set of operative parameters to be used, and possibly the brand, or other information.

According to some embodiments, in the event the type of coffee beans is new, the method provides to create and store a new profile PN+1 of coffee beans, associating it with the set of operative parameters S selected for the characteristics of the type of coffee beans considered.

According to some embodiments, in the event the type of coffee beans is not new, and a profile Pi associated with it already exists, the method can provide to carry out another process of optimization of the setting parameters associated with the profile Pi on the basis of the real and actual functioning of the machine 10 with the setting parameters set and possibly of feedback received from the consumer 30.

According to some embodiments, the optimization process provides to measure at least one actual extraction parameter of the machine 10 during the preparation of a beverage and compare it with the value of the at least one expected extraction parameter of the set of operative parameters considered and, if these values do not correspond, determine if and how to modify the at least one setting parameter.

According to some embodiments, to perform the further optimization process, the method provides to:

prepare a test coffee beverage with the setting parameters set of the set of operative parameters S associated with the profile Pi;

acquire feedback from the consumer 30 on one or more characteristics of the test beverage prepared;

process the data relating to the consumer feedback together with the data relating to the comparison between the expected and the actual extraction parameter(s), and determine whether or not it is necessary to modify one or more setting parameters of the set of operative parameters Pi used.

According to some embodiments, the method provides to measure at least the infusion time, or flow time, used for the preparation of the test beverage and compare it with an expected value in order to verify whether the infusion process of the beverage is adequate for the setting parameters used, and possibly identify a malfunction of one or more components of the machine 10.

According to some embodiments, the method provides to measure one or more actual values of the extraction parameters during the preparation of the coffee and store them in the memory unit, so as to keep track of the actual extraction parameters of at least a predefined number of dispensations, for example the last 5, 10, 20 or more, and to compare the values of the expected extraction parameters with the actual values measured and stored, or with an average value thereof, in order to check for any deviations from them that could indicate a malfunction of the machine 10.

According to some embodiments, the method provides to verify, at each beverage preparation process, whether one or more of either the coffee dose, temperature, coffee grinder level, or other parameters correlated to the setting parameters, correspond to the setting parameters of the set of operative parameters selected, and therefore whether the different components of the machine 10 have been set correctly, or need regulating.

In the event that the components are set correctly, and the actual extraction parameters do not correspond with the expected extraction parameters, a malfunction may have occurred.

For example, if the temperature of the infusion water measured is lower than the expected value, this could indicate a possible accumulation of limescale in the boiler, or in any case a malfunction thereof, while a coarser granulometry of the coffee powder could indicate wear of the grinding device.

According to some embodiments, the step of acquiring the feedback from the consumer 30 provides to receive, by means of the interface 26, feedback on one or more characteristics of the test beverage prepared.

According to some embodiments, the acquisition of feedback from the consumer 30 provides to pose a plurality of questions to the consumer 30 on one or more visual, olfactory and/or taste characteristics of the coffee beverage prepared and to receive the corresponding answers.

According to some embodiments, the questions can relate to one or more of either the quantity of froth, the color of the froth, the structure of the body, or other characteristics such as the color of the coffee, the temperature of the coffee, the quantity of beverage, or the aroma. The questions can be of the multiple-choice type.

According to some embodiments, the method provides to question the consumer 30 at least about the quantity of froth, the color of froth and the structure of the body of the beverage prepared.

The questioning of the consumer 30 advantageously allows the control unit 28 to understand if there have been problems or inefficiencies, for example, but not only, during the infusion and/or grinding, in order to optimize the process parameters for the subsequent dispensing of a coffee beverage.

According to some embodiments, the method provides to modify at least one parameter selected from the granulometry of the coffee powder, the quantity of coffee and the temperature of the water at least partly as a function of the feedback provided by the user.

According to some embodiments, before modifying at least one parameter, the method provides to compare the actual characteristics of the beverage indicated by the consumer 30 with the characteristics expected for the type of coffee beans used.

In the event that the actual characteristics of the beverage prepared correspond to the expected characteristics, then it is determined that the machine is functioning correctly, and the set of parameters used is optimized for the type of coffee beans in use. In the event the consumer 30 is not satisfied with the beverage obtained with this set of parameters, therefore it is determined that this is not due to malfunctions of the machine, or to an incorrect setting thereof, but can be due to water excessively rich in limescale, or to the type of coffee beans.

In the event the actual characteristics do not correspond, or correspond only in part, to the expected characteristics, then it is determined that the set of parameters used can be optimized further, or there may have been some malfunction of the machine 10.

According to these embodiments, the method provides to identify the setting parameter or parameters responsible for one or more of the non-corresponding characteristics, and possibly modify it/them.

By way of example, if the non-corresponding characteristic relates to the froth, the infusion temperature can be modified, if the non-corresponding characteristic relates to the body of the beverage, the quantity of coffee can be modified and, if the infusion time, or flow time, is above or below determinate threshold values, the granulometry of the coffee powder can be modified.

According to some embodiments, before modifying one setting parameter of the set of operative parameters Si, the method provides to compare the setting parameter identified with a respective range of values predefined for the given type of coffee beans and verify whether it is possible to modify this setting parameter remaining within this range. The ranges of values can be determined by the physical limits of the machine and/or of the process, such as for example the maximum or minimum level of grinding of the beans, or the quantity of coffee usable for a single beverage, or the temperature of the water that has to remain within determinate values, for example between 92° C. and 98° C.

For example, if the consumer 30 indicates a lighter froth color than the one expected, the method provides to verify whether the temperature is already at a predefined maximum value and, only in the negative case, increase it slightly, while, if the consumer 30 indicates a froth color darker than the one expected, the method provides to verify whether the temperature is already at a predefined minimum value and, only in the negative case, lower it slightly, for example by 1° C. or by a few tenths of a degree.

According to some embodiments, in the event the parameter is already at a limit value, and therefore the set of operative parameters used is already optimized with respect to the physical limits and the properties of the machine 10, the method provides to signal to the consumer 30 the need to carry out maintenance work, possibly to suggest modifying other variables that can influence the quality of the coffee beverage dispensed.

For example, by means of the interface 26 it can be suggested to carry out a descaling of the water path, the replacement, or cleaning, of a filter, or possibly change the type of water, for example choosing one with less solid residues. The method can also provide to suggest to the consumer to try to change the type of coffee beans.

According to some embodiments, the method can also provide to store the new set of operative parameters S' in the profile Pi of the coffee beans considered.

In this way, the new set of operative parameters S' will be used at the next request for a coffee beverage with that determinate profile Pi of coffee beans.

According to some embodiments, the new set of operative parameters S' registered in the profile Pi allows to optimize the functioning of the machine 10 as a function of this type of coffee beans used. In this way, a set of parameters S' is obtained, optimized both from the point of view of the objective evaluation of the beverage by the consumer 30, and also from the point of view the use of a determinate type of coffee beans.

In the event the consumer 30 continues to not be satisfied with the result, a further optimization process can be carried out.

According to other embodiments, the method provides to make visible to the consumer 30 by means of the interface 26 at least some setting parameters of the new set of operative parameters S' and to store the new set of operative parameters S' in the corresponding profile Pi after having received confirmation from the consumer 30.

According to some embodiments, the setting parameters made visible to the consumer 30 comprise one or more of either the quantity of coffee to be used, the granulometry of the coffee and the infusion temperature, infusion time, quantity of infusion water, infusion pressure and/or pre-infusion characteristics, including water temperature and/or flow rate, and/or pre-infusion time.

According to possible variant embodiments, the method can provide to allow the consumer 30 to modify by means of the interface 26 one or more of the displayed setting parameters of the new set of parameters S', before confirming them.

According to some embodiments, it can be provided to allow the consumer 30 to make changes to the setting parameters only within a determinate range of values, for example within a range of 10%, not allowing the use of incorrect combinations of parameters that would give as a result a coffee beverage with characteristics far removed from good quality standards.

Advantageously, in this way a database of profiles for each type of beans used is registered in the memory unit 29 or a database in a continuous and dynamic way by means of the control unit 28. This allows to avoid the active intervention of the consumer 30 in the modification of the process parameters of the machine 10, thus obtaining a machine 10 that can be used by experienced or inexperienced consumers 30, that is, without the need to fully understand the functioning of the machine 10, and at the same time that allows to obtain the best possible beverage on the basis of the type of coffee beans.

According to some embodiments, the method can provide to count the number of requests of optimization processes for a determinate coffee bean profile, and possibly provide the consumer 30 with information on the type of coffee beans he/she is using, or possibly invite him/her to try new types of coffee beans, possibly suggesting the characteristics as a function of the feedback received. For example, the control unit 28, on the basis of the data present in the memory unit 29, and of the different types of coffee beans, can suggest to the consumer 30 by means of the interface 26 the one that allows to obtain determinate characteristics of the froth or of the structure of the body.

According to other embodiments, the method can provide to associate a determinate profile Pi with a determinate consumer 30, allowing a personalization and optimization of the coffee beverage both as a function of a type of coffee beans, and also of the personal taste of the consumer 30.

It is clear that modifications and/or additions of parts or steps may be made to the machine for preparing coffee beverages and to the corresponding regulation method as described heretofore, without departing from the field and scope of the present invention as defined in the claims.

In particular, although the invention has been described in relation to the optimization of a coffee beverage of the espresso type, it is not excluded that it can be applied to other types of beverages, providing that for each of them a determinate quality "target" that the beverage prepared has to have is defined. For example, coffee beverages of the cappuccino, macchiato, Americano or ristretto type can come within the field and scope of the present invention, or also other beverages based for example on ginseng, tea, or similar or comparable infusions that require an infusion of a determinate substance, which may present different varieties and characteristics. In this case, the questions posed to the consumer and the infusion parameters will be correlated and adapted to the beverage considered.

It is also clear that, although the present invention has been described with reference to some specific examples, a person of skill in the art shall certainly be able to achieve many other equivalent forms of machine 10 for preparing coffee beverages and corresponding regulation method, having the characteristics as set forth in the claims and hence all coming within the field of protection defined thereby.

The invention claimed is:

1. Machine for preparing coffee beverages, comprising:
    an infusion unit comprising an infusion chamber suitable to contain a coffee powder to be subjected to infusion;
    a grinding unit configured to grind coffee beans and obtain the coffee powder with a desired granulometry;
    a water tank connected to the infusion unit;
    a water pump configured to feed water from the tank to the infusion unit;
    a boiler configured to heat the water fed to the infusion unit;
    a dispensing unit fluidically connected to the infusion unit and configured to dispense a beverage prepared into a receptacle;
    a detection device configured to measure or detect an actual extraction parameter during the functioning of the machine;
    a memory unit or database in which a plurality of sets of operative parameters are stored and/or made available, each of the sets of operative parameters associated with a type of coffee beans and suitable to obtain a coffee beverage with properties defined for the type of coffee beans, each of the sets of operative parameters comprising one or more setting parameters and an expected value of an extraction parameter correlated with the set of operative parameters, the type of coffee beans comprises a variety of the coffee beans and a roasting level of the coffee beans;
    an interface configured to acquire the information on the selected type of coffee beans to be used to brew the beverage;
    a controller communicating with the interface and configured to receive from the interface the information on the selected type of coffee beans, the controller further configured to perform a first approximate optimization of the machine by commanding a functioning of the machine on the basis of the one or more setting parameters of a selected set of operative parameters in the sets of operative parameters that is selected based upon the selected type of coffee beans, wherein the controller is also configured to carry out a second fine optimization of the machine on the basis of the actual functioning of the machine with the selected set of operative parameters, wherein the second fine optimization comprises determining, based upon a comparison between the actual extraction parameter measured or detected by the detection device and the expected extraction parameter correlated with the selected set of operative parameters, whether or not to modify the one or more setting parameters of the selected set of operative parameters stored or made available in the memory unit or database.

2. The machine as in claim 1, wherein the controller is configured to receive, by means of the interface, feedback from a consumer about the beverage prepared by the machine based upon the selected set of operative parameters, and to determine whether or not to modify the one or more setting parameters of the selected set of operative parameters on the basis of the feedback received.

3. The machine as in claim 2, wherein the feedback from the consumer comprises information in relation to one or more characteristics of the beverage, selected from:
    quantity and/or color of cream;
    structure of body; and
    intensity of flavor; and wherein the controller is configured to process data acquired by the interface, and to determine whether the beverage prepared corresponds, or not, to the characteristics expected for beverages prepared according to the selected set of operative parameters.

4. The machine as in claim 1, wherein at least one of the sets of operative parameters comprises a combination of at least two setting parameters selected from granulometry/grinding level of the coffee beans, a quantity of the coffee powder for the beverage, temperature of the water fed to the infusion unit, infusion time, quantity of the water fed to the infusion unit, infusion pressure and/or pre-infusion characteristics.

5. The machine as in claim 1, wherein a dedicated software application is installed on the interface, which application is configured to display multiple choice type questions to a consumer and to receive and acquire the respective answers.

6. The machine as in claim 1, wherein a software application is installed on the interface by means of which a list of brands of coffee beans supplied by one or more producers is made available to a consumer, from which the consumer can select the brand to use, each brand being associated with a set of operative parameters.

7. The machine as in claim 1, wherein the detection device is configured to measure, during the preparation of beverages by the machine, one or more actual dispensing parameters selected from flow time, infusion or dispensing time of the beverage, infusion temperature, infusion pressure, speed and/or flow rate of the water fed, quantity of infusion water, or beverage dispensed, or one or more pre-infusion characteristics.

* * * * *